(12) United States Patent
Johnson

(10) Patent No.: US 12,187,432 B2
(45) Date of Patent: Jan. 7, 2025

(54) PAYLOAD DELIVERY DEVICE

(71) Applicant: Adam Johnson, Broadus, MT (US)

(72) Inventor: Adam Johnson, Broadus, MT (US)

(*) Notice: Subject to any disclaimer, the term of this patent is extended or adjusted under 35 U.S.C. 154(b) by 132 days.

(21) Appl. No.: 18/058,637

(22) Filed: Nov. 23, 2022

(65) Prior Publication Data

US 2023/0159166 A1 May 25, 2023

Related U.S. Application Data

(60) Provisional application No. 63/282,295, filed on Nov. 23, 2021.

(51) Int. Cl.
*B64D 1/12* (2006.01)
*B64U 101/60* (2023.01)
(52) U.S. Cl.
CPC ............ *B64D 1/12* (2013.01); *B64U 2101/60* (2023.01)
(58) Field of Classification Search
CPC ........ B64D 1/08; B64D 1/12; B64D 1417/30; B64D 1417/40; B64D 1417/78; B64U 2101/69; B66C 1/127; B66C 1/18; B66C 1/20; A45F 3/08
See application file for complete search history.

(56) References Cited

U.S. PATENT DOCUMENTS

| | | | |
|---|---|---|---|
| 5,579,966 A * | 12/1996 | Krumweide | ............... A45F 3/08 294/157 |
| 9,694,910 B2 | 7/2017 | MacCallum et al. | |
| 10,131,437 B1 | 11/2018 | Hanlon | |
| 10,745,130 B2 | 8/2020 | Potter et al. | |
| 2019/0263489 A1 | 8/2019 | Coles | |

FOREIGN PATENT DOCUMENTS

WO 2014191749 A1 12/2014

* cited by examiner

Primary Examiner — Nicholas McFall

(57) ABSTRACT

A payload delivery device is an apparatus designed to facilitate the delivery of emergency items to a target location via aerial vehicles. The apparatus includes a base strap, a plurality of holder straps, and a plurality of cargo straps. The base strap serves as the central structure of the apparatus that supports the plurality of holder straps and the plurality of cargo straps. The plurality of holder straps includes several straps designed to retain a parachute and the devices necessary to facilitate the deployment of the parachute. The plurality of holder straps is also designed to facilitate the operation of the parachute while securing the parachute to the base strap. The plurality of cargo straps include several straps that secure the payload to the apparatus. The plurality of cargo straps can also be arranged to accommodate the shape and size of the payload to be delivered using the apparatus.

19 Claims, 10 Drawing Sheets

PAYLOAD DELIVERY DEVICE

The current application claims a priority to the U.S. provisional patent application Ser. No. 63/282,295 filed on Nov. 23, 2021.

FIELD OF THE INVENTION

The present invention relates generally to transportation and delivery systems. More specifically, the present invention provides a payload delivery device designed to facilitate the delivery of desired payloads via manned or unmanned aerial vehicles.

BACKGROUND OF THE INVENTION

Emergency medical services are generally delayed to emergency situations and scenes due to different factors such as distance, location of patient/victim, terrain, etc. Military providers that are engaged in Prolonged Field Care (PFC) or Prolonged Casualty Care (PCC) are required to treat and maintain a single patient in remote and austere environments for up to 72 hours on their own with limited gear. The idea of using both manned and unmanned aircraft to reduce the time to initial response of medical supplies or resupply to forward military operators in hazardous situations is a current challenge in the medical field.

A survey was completed at the University College Cork in 2020 where 94% of participants agreed that a payload harness that can be integrated into manned and unmanned aircraft is something that would both be useful and is currently needed in the medical response field. Participants also agreed that on the civilian side using a brightly colored parachute with alternating colors (i.e., bright orange/white, red/yellow, etc.) would assist in locating a victim during search and rescue operations. Therefore, there is a need for an improved payload harness and parachute device that may overcome one or more of the above-mentioned problems and/or limitations.

An objective of the present invention is to provide a payload delivery device designed to be transported by an Unmanned Aerial Vehicle (UAV). The present invention can be transported by a UAV to a target area where the payload delivery device can be deployed. Another objective of the present invention is to provide a payload delivery device that safely delivers the desired payload to the target location. The present invention is designed to securely hold the payload while the payload is descending towards the target location. Another objective of the present invention is to provide a payload delivery device that protects the payload from any external forces resulting from the landing of the payload. Additional features and benefits of the present invention are further discussed in the sections below.

SUMMARY OF THE INVENTION

The present invention provides a payload delivery device designed to safely and securely deliver desired payloads. The present invention may be used with both unmanned and manned aircraft to increase the survivability of patients and victims in emergency situations. For example, the present invention may sustain and resupply military operators engaged in Prolonged Field Care (PFC) or Prolonged Casualty Care (PCC) and support Tactical Combat Casualty Care (TCCC) operations including the tactical evacuation phase (TECEVAC) by providing medical support supplies to operators. At the same time, the present invention could sustain victims in a remote civilian mountain environment. The present invention may be capable of carrying upwards of 20 pounds (lbs) for an unmanned aircraft and 30 to 60 lbs or greater depending on the aircraft requirements of emergency operators which can allow for greater payloads that offer better care in the field, increased survival, and lower mortality rates. The present invention may also assist in the rescue and sustainment of astronauts exploring other planetary bodies when natural rescue operations are currently limited, presently extended, and time is of the essence. The present invention can be used on other planetary bodies for immediate intervention while other rescue plans are being considered and acted on.

In some embodiments, the payload delivery device preferably includes means to safely and securely deliver the payload to target location, such as a parachute. Further, the payload delivery device protects the payload as the payload lands on the target location from any external forces the payload may experience while landing. Accordingly, in the preferred embodiment, the payload delivery device may include a stirrup or saddle-type harness with at least four cross arms. The four cross arms may be reinforced with single or dual layers of material. Further, the payload delivery device may include a top connection point with an anchor to be used to secure a parachute connection. The top connection also enables the attachment to manned or unmanned aerial vehicles, where the four cross arms each act as fail-safe for the device. In other embodiments, the payload delivery device may include a harness with an incorporated parachute.

Further, the payload device may be made from material with 5,000-pound tensile strength and is fireproof-rated up to 660 degrees Fahrenheit. The present invention may include various connectors such as metal clasps. The metal clasps are rated for a breaking strength of 18 kilonewtons (kN) (4,046.56 pounds per clasp). Each clasp is also ANSI-approved. Furthermore, the incorporated parachute of the present invention may be deployed upon release of the harness from the aerial vehicle giving the vehicle time to clear the area and to allow the proper deployment of the parachute. The present invention may be designed to deliver payloads from a hover position or in motion position to providers, patients, or victims on the ground.

Further, the present invention is designed to retain the payload securely while the parachute facilitates the controlled descent of the payload to the ground to reduce injury and/or damage to property included in the payload. This fits the guidelines posted by the FAA for part 107.23 concerning dropping items from unmanned aircraft. In some embodiments, the present invention may include inflatable attachments that are capable of being deployed upon contact with water to ensure the payload stays afloat. The payload and the inflatable attachments may create a personal flotation platform for rescuers, patients, or victims in the water. Further, the payload delivery device may include a back spine having two layers of webbing to allow for adjustment of the cross arms for oblong payloads as needed. Each opening and overlay of the cross straps may have a reinforced box stitch above and below to ensure that the cross arms are secure. Furthermore, the present invention may include an Automatic Deployment System (ADS) or Automatic Trigger System (ATS) that allows the payload to free fall as the aircraft safely moves away from the area before the parachute is deployed based on either time or altitude.

DETAIL DESCRIPTIONS OF THE INVENTION

Figure 1:
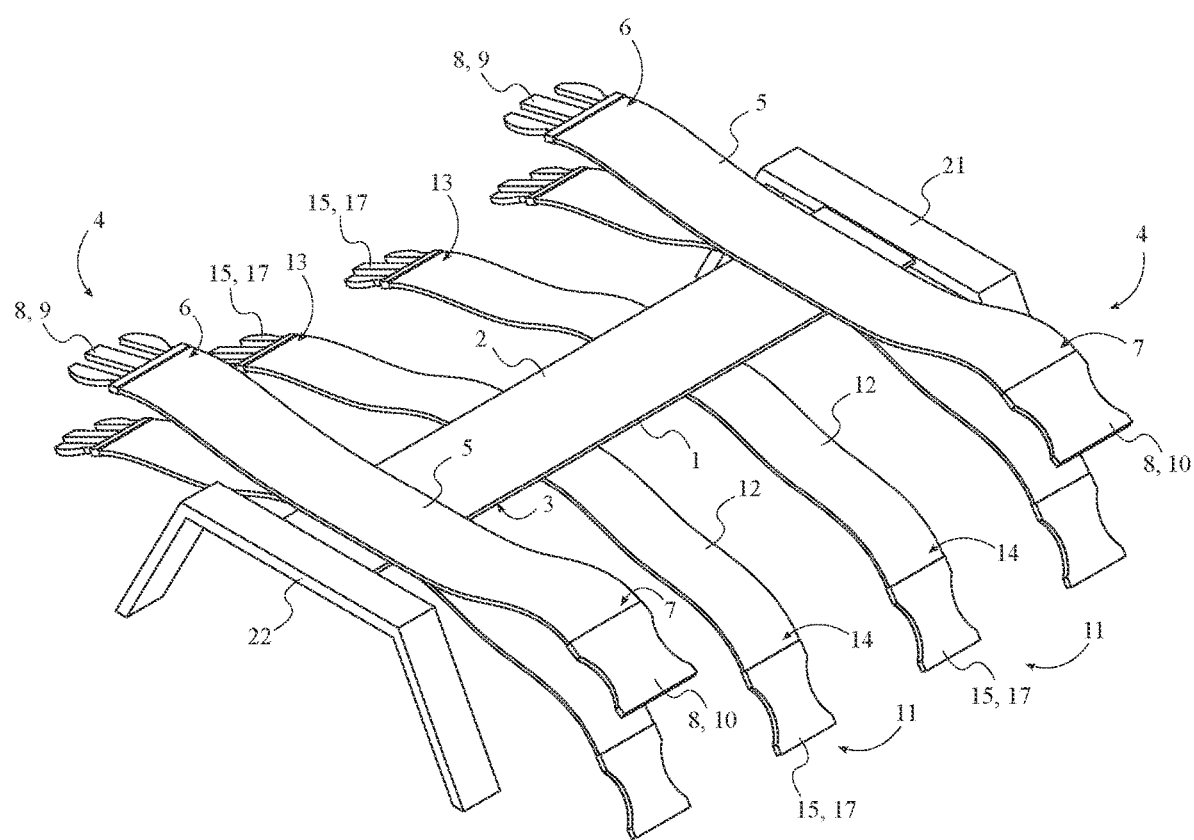
FIG. 1 is a top front perspective view of the present invention, wherein a plurality of cargo straps and the plurality of holder straps are shown unfastened.
Figure 2:
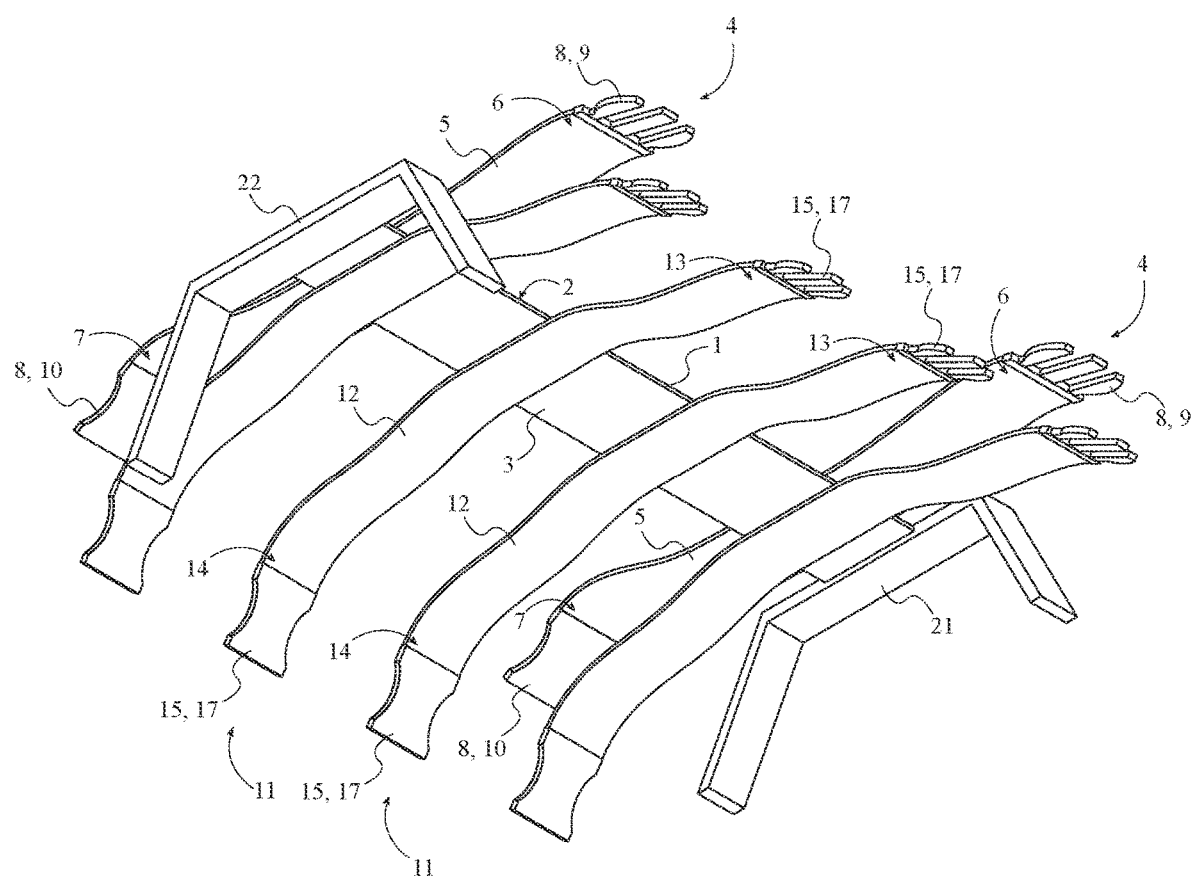
FIG. 2 is a bottom rear perspective view of the present invention, wherein the plurality of cargo straps and the plurality of holder straps are shown unfastened.
Figure 3:
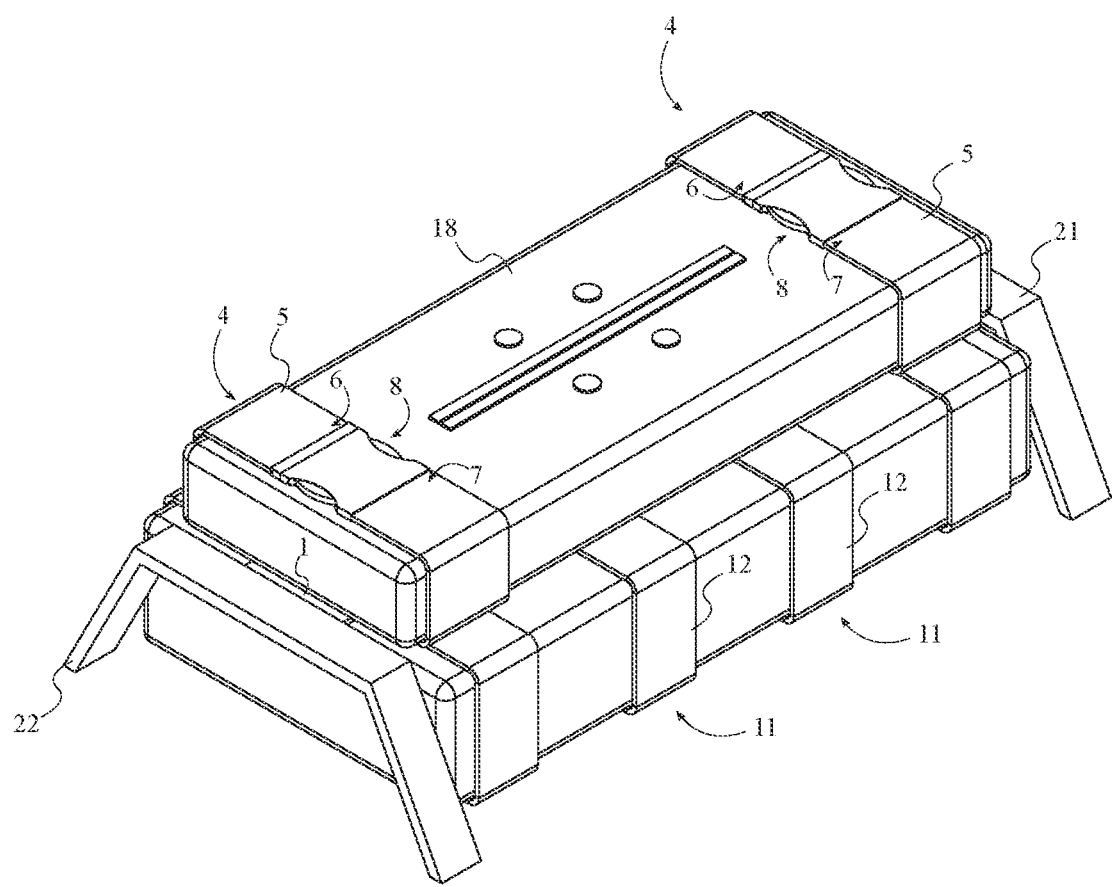
FIG. 3 is a top front perspective view of the present invention, wherein the plurality of cargo straps and the plurality of holder straps are shown fastened, and wherein a chute canister and a payload are shown mounted.
Figure 4:
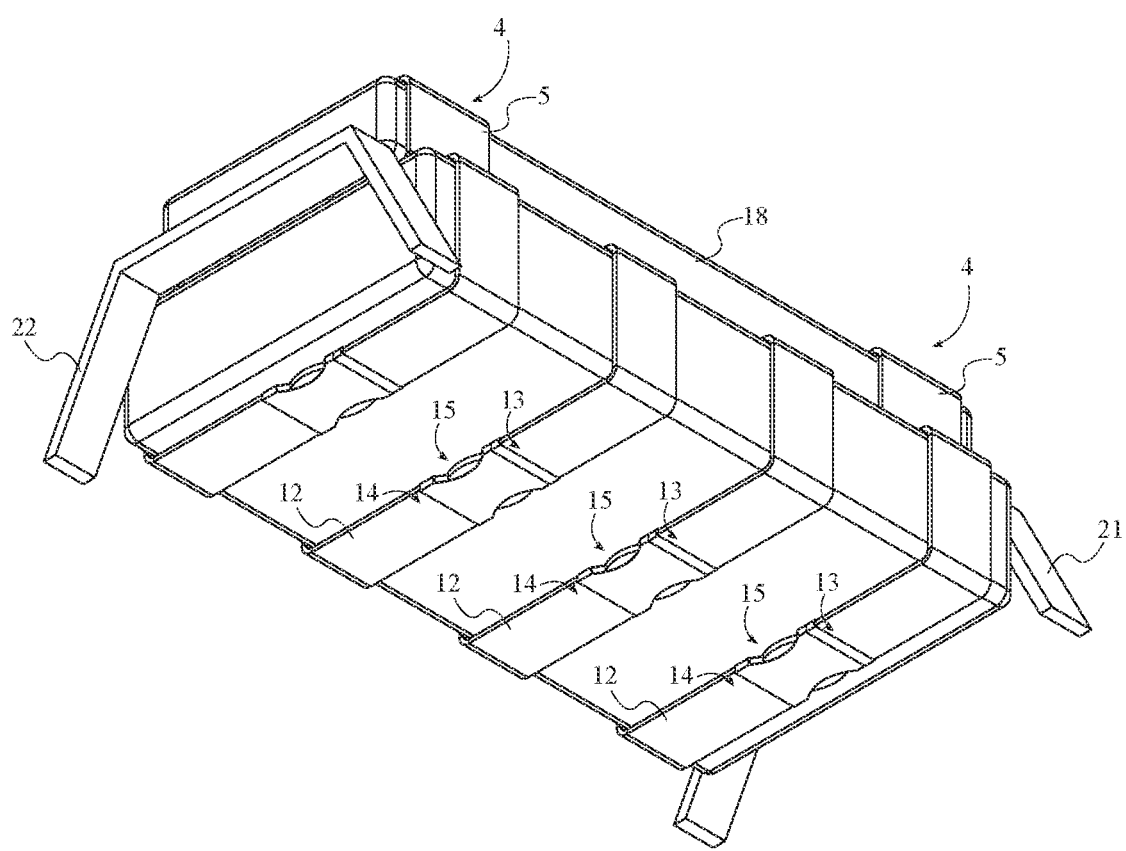
FIG. 4 is a bottom rear perspective view of the present invention, wherein the plurality of cargo straps and the plurality of holder straps are shown fastened, and wherein a chute canister and a payload are shown mounted.

All illustrations of the drawings are for the purpose of describing selected versions of the present invention and are not intended to limit the scope of the present invention.

The present invention is a payload delivery device designed to facilitate the delivery of emergency items to a target location via aerial vehicles. As can be seen in FIGS. 1 through 4, the present invention comprises a base strap 1, a plurality of holder straps 4, and a plurality of cargo straps 11. The base strap 1 serves as the central structure of the present invention that supports the plurality of holder straps 4 and the plurality of cargo straps 11. The plurality of holder straps 4 includes several straps designed to retain a parachute 19 and the devices necessary to facilitate the deployment of the parachute 19. The plurality of holder straps 4 is also designed to facilitate the operation of the parachute 19 while securing the parachute 19 to the base strap 1. The plurality of cargo straps 11 include several straps that secure the payload to the present invention. The plurality of cargo straps 11 can also be arranged to accommodate the shape and size of the payload to be delivered. In some embodiments, the base strap 1, the plurality of holder straps 4, and/or the plurality of cargo straps 11 can have civilian and military specifications capable of sustaining 20 pounds (lbs.) of weight while suspended from an unmanned aircraft up to 400 feet (ft) and able to sustain drop forces when a parachute 19 is deployed at or near terminal velocity. The present invention can be capable of being able to slow a 20 lb. payload to 4 meters per second (m/s).

The general configuration of the aforementioned components enables a more secure and safe way of payload delivery via various aerial vehicles such as Unmanned Aerial Vehicles (UVAs). As can be seen in FIGS. 1 through 4, the base strap 1 is preferably a wide, long strap that is made from strong material able to retain the parachute 19, associated devices, as well as the payload. Due to the overall flat shape of the base strap 1, the base strap 1 comprises a first base face 2 and a second base face 3. The first base face 2 and the second base face 3 correspond to the opposite flat faces of the base strap 1. To assemble the present invention, the plurality of holder straps 4 is positioned parallel to each other. Further, each of the plurality of holder straps 4 is positioned perpendicular to the base strap 1. This way, each of the plurality of holder straps 4 forms a "T" shape with the base strap 1. In addition, the plurality of holder straps 4 is distributed along the base strap 1 to distribute the load from the parachute 19 on the base strap 1. Further, the base strap 1 is centrally positioned to each of the plurality of holder straps 4 to evenly distribute the load subjected by the corresponding holder strap on the base strap 1. Each of the plurality of holder straps 4 is connected onto the first base face 2 to secure the various holder straps to the base strap 1. In a similar manner, the plurality of cargo straps 11 is positioned parallel to each other. In addition, the plurality of cargo straps 11 is positioned perpendicular to the base strap 1. This way, each of the plurality of cargo straps 11 also forms a "T" shape with the base strap 1. In addition, the plurality of cargo straps 11 is distributed along the base strap 1 to distribute the load from the payload on the base strap 1. Further, the base strap 1 is centrally positioned to each of the plurality of cargo straps 11 to evenly distribute the load subjected by the corresponding cargo strap on the base strap 1. Furthermore, each of the plurality of cargo straps 11 is connected onto the second base face 3 to secure the various cargo straps to the base strap 1.

Further, the base strap 1, the plurality of holder straps 4, and the plurality of cargo straps 11 may be black. The style associated with the present invention may be Amp 5000 lbs. rated heavy-duty mil-spec military-grade nylon fastening. Further, the height associated with the present invention may be a minimum of 1.75 inches and the length may be 13.5 inches. Further, the weight associated with the present invention may be 8 pounds. A width associated with the present invention may be 13.5 inches. Further, a material type associated with the present invention may be nylon, a nylon blend (i.e. nylon/Kevlar), or nylon webbing. In some embodiments, the plurality of cargo straps 11 may be two or four cargo straps, and each cargo strap may be reinforced and include a second layer. Further, the base strap 1, the plurality of holder straps 4, and the plurality of cargo straps 11 can be made from 5,000-pound tensile strength material and be fireproof up to 660 degrees Fahrenheit. In other embodiments, the present invention may include spider straps that are for patient restraints to a long backboard but may use hook and loop fastener connections with a corresponding design.

In some embodiments, the present invention can be provided with an incorporated parachute 19 as well as the devices necessary to facilitate the deployment of the parachute 19. As can be seen in FIGS. 3 through 7 and 10, the present invention may further comprise a chute canister 18 designed to readily retain a parachute 19 that is deployed according to predetermined conditions. To incorporate the chute canister 18 onto the base strap 1, the chute canister 18 is positioned along the base strap 1 to evenly secure the chute canister 18 onto the base strap 1. Further, each of the plurality of holder straps 4 is laterally positioned around the chute canister 18 so that the chute canister 18 is restrained against the first base face 2 by the plurality of holder straps 4. This way, the chute canister 18 is safely secured to the base strap 1 while the present invention is being transported. Further, the present invention may further include a parachute 19 and an automatic deployment system (ADS) 20. The chute canister 18 can be equipped with the parachute 19 prior to the present invention being mounted onto the desired aerial vehicle. Accordingly, the parachute 19 is positioned within the chute canister 18 while the present invention is being transported by the chose aerial vehicle. Similarly, the ADS 20 is mounted within the chute canister 18 so that the ADS 20 can be engaged to deploy the parachute 19. The ADS 20 is operatively coupled to the parachute 19, wherein the ADS 20 is used to automatically deploy the parachute 19 from the chute container at a specified altitude. For example, the ADS 20 can include a controller equipped with several sensors, such as an altimeter, a timer, etc., that engages the ADS 20 according to predetermined thresholds. In addition, the ADS 20 can be equipped with a mechanism that releases the chute canister 18 to enable the parachute 19 to be deployed. Further, the ADS 20 can include a mechanism that forces the parachute 19 out of the chute canister 18, such a pyrotechnic or mechanical device that moves the parachute 19 out of the chute canister 18. Alternatively, the ADS 20 may be attached to a canister or similar device allowing for a spring-loaded, CO2, or similar activation system to rapidly deploy the parachute 19 to allow for appropriate speed control. In alternate embodiments, the present invention can utilize different mechanisms to automatically deploy the parachute 19 at predetermined conditions.

As previously discussed, the present invention further secures the safe delivery of the payload by protecting the payload from undesired damage during the landing of the payload. As can be seen in FIGS. 1 through 9, the present invention may further comprise a first landing riser 21 and a second landing riser 22 that reduces the landing forces that may compromise the payload. The first landing riser 21 and the second landing riser 22 are designed to be attached or made part of the present invention to accommodate and protect the payload. Accordingly, the first landing riser 21 and the second landing riser 22 are positioned parallel to each other and separate from each other to accommodate the size. In addition, the first landing riser 21 is terminally connected to the base strap 1 to secure the first landing riser 21 to the base strap 1. Similarly, the second landing riser 22 is terminally connected to the base strap 1, opposite to the first landing riser 21, to secure the second landing riser 22 to the base strap 1. This way, when the payload is secured to the base strap 1 using the plurality of cargo straps 11, the payload is positioned between the first landing riser 21 and the second landing riser 22. Further, the first landing riser 21 and the second landing riser 22 are overall larger than the payload so that when the payload lands on the target location, the first landing riser 21 and the second landing riser 22 receive most of the load from the landing.

As can be seen in FIGS. 1 through 4, to facilitate the fastening of the chute canister 18 to the base strap 1, each of the plurality of holder straps 4 may comprise a holder strap body 5 and a holder strap fastener 8. The holder strap body 5 corresponds to the body of every holder strap, while the holder strap fastener 8 corresponds to the fastening mechanism that enables every holder strap to be fastened around the chute canister 18. To secure the holder straps using the corresponding holder strap fastener, the holder strap body 5 comprises a first holder strap end 6 and a second holder strap end 7 corresponding to the terminal ends of the holder strap body 5. Further, the holder strap fastener 8 may comprise a first holder interlocking piece 9 and a second holder interlocking piece 10 corresponding to the separate interlocking pieces of the holder strap fastener 8. For example, the holder strap fastener 8 can be a snap-fit buckle with a male member and a female member. Further, the holder strap fastener 8 can withstand the drop and pull forces of a deployed parachute 19. To secure the first holder interlocking piece 9 to the holder strap body 5, the first holder interlocking piece 9 is connected adjacent to the first holder strap end 6. Similarly, the second holder interlocking piece 10 is connected adjacent to the second holder strap end 7 to secure the second holder interlocking piece 10 to the holder strap body 5. This way, once the holder strap body 5 is positioned around the chute canister 18, the user can engage the first holder interlocking piece 9 with the second holder interlocking piece 10 to fasten the chute canister 18 to the base strap 1 using the various holder straps.

Similar to the plurality of holder straps 4, each of the plurality of cargo straps 11 may comprise a cargo strap body 12 and a cargo strap fastener 15. As can be seen in FIGS. 1 through 4, the cargo strap body 12 corresponds to the body of every cargo strap, while the cargo strap fastener 15 corresponds to the fastening mechanism that enables every cargo strap to be fastened around the payload. To secure the cargo straps using the corresponding cargo strap fastener, the cargo strap body 12 may comprise a first cargo strap end 13 and a second cargo strap end 14 corresponding to the terminal ends of the cargo strap body 12. Further, the cargo strap fastener 15 may comprise a first cargo interlocking piece 16 and a second cargo interlocking piece 17 corresponding to the separate interlocking pieces of the cargo strap fastener 15. For example, the cargo strap fastener 15 can be a snap-fit buckle with a male member and a female member. Further, the cargo strap fastener 15 can withstand the drop and pull forces of a deployed parachute 19. To secure the first cargo interlocking piece 16 to the cargo strap body 12, the first cargo interlocking piece 16 is connected adjacent to the first cargo strap end 13. Similarly, the second cargo interlocking piece 17 is connected adjacent to the second cargo strap end 14 to secure the second cargo interlocking piece 17 to the cargo strap body 12. This way, once the cargo strap body 12 is positioned around the payload, the user can engage the first cargo interlocking piece 16 with the second cargo interlocking piece 17 to fasten the payload to the base strap 1. The holder strap fastener 8 and the cargo strap fastener 15 can be D-Ring COBRA ProStyle rated at 18 kilo-Newtons (kN). Further, the size of the holder strap fastener 8 and the cargo strap fastener 15 may be 1.75 in/45 mm black D-Ring. Further, the minimum breaking load of the holder strap fastener 8 and the cargo strap fastener 15 may be 18 kN. The material body of the holder strap fastener 8 and the cargo strap fastener 15 may be aluminum. Further, characteristics associated with the holder strap fastener 8 and the cargo strap fastener 15 specifications may include standard clips, one side adjustable, integrated D-Ring with color matte black. Further, the holder strap fastener 8 and the cargo strap fastener 15 may include Cross Arm Connections COBRA ProStyle 18 kN with a size of 1.75 in/45 mm and minimum breaking load of 18 kN. Further, the material body of the base strap 1 may be 12 mm aluminum with the color KTL black.

Figure 7:
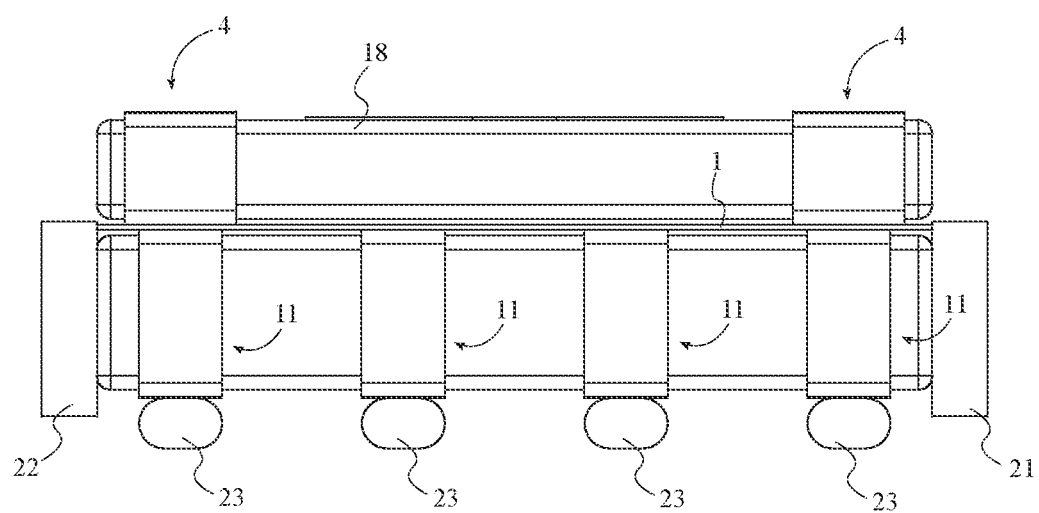
FIG. 7 is a side view of the present invention, wherein the plurality of cargo straps and the plurality of holder straps are shown fastened, and wherein the chute canister and the payload are shown mounted, and wherein a plurality of cargo flotation devices is shown inflated.

As previously discussed, the present invention provides means to protect the payload once the payload lands on the target location. If the payload lands on a body of water, the present invention can further provide means to maintain the payload afloat. As can be seen in FIG. 7, the present invention may further comprise a plurality of cargo flotation devices 23. The plurality of cargo flotation devices 23 is designed to automatically deploy once the payload is in contact with a body of water. Accordingly, the plurality of cargo flotation devices 23 is positioned offset from the base strap 1 along the cargo strap body 12. In addition, each of the plurality of cargo flotation devices 23 is connected adjacent to a corresponding cargo strap from the plurality of cargo straps 11. This way, once the payload enters the body of water, the plurality of cargo flotation devices 23 is engaged to maintain the payload floating on the body of water. Further, the plurality of cargo flotation devices 23 can enable the payload to be used as a flotation device by the users whom the payload is delivered too. For example, a rescue package can be sent to overboard passengers who can use the floating rescue package to float while the rescue operation is deployed.

Figure 5:
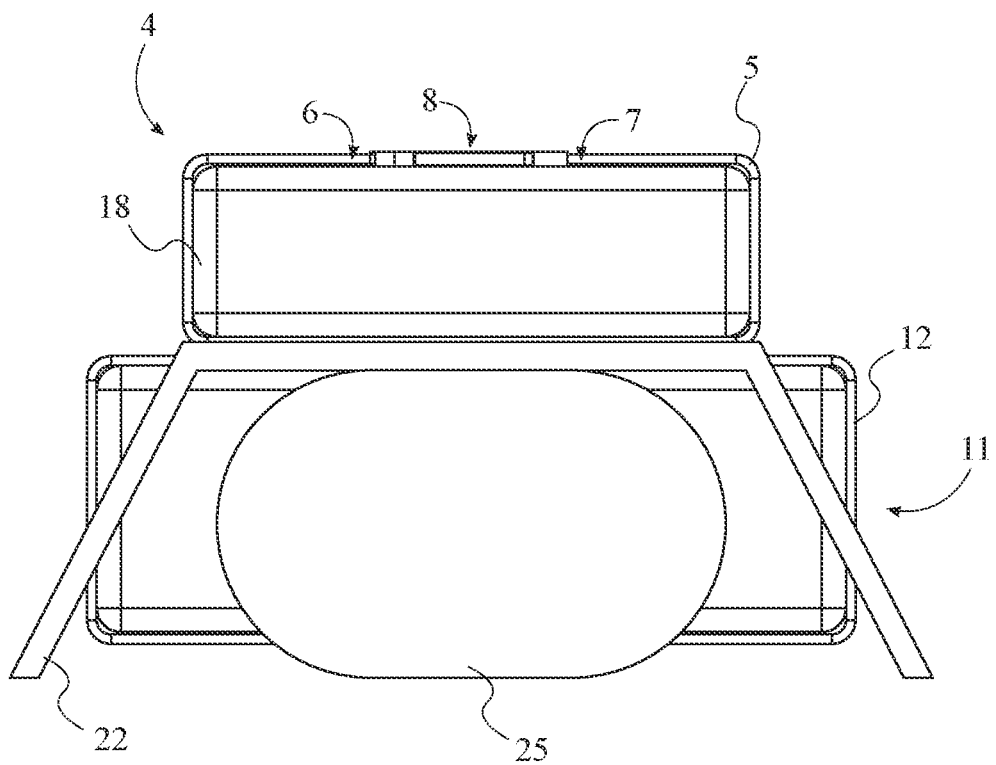
FIG. 5 is a front view of the present invention, wherein the plurality of cargo straps and the plurality of holder straps are shown fastened, and wherein the chute canister and the payload are shown mounted, and wherein a second base flotation device is shown inflated.
Figure 6:
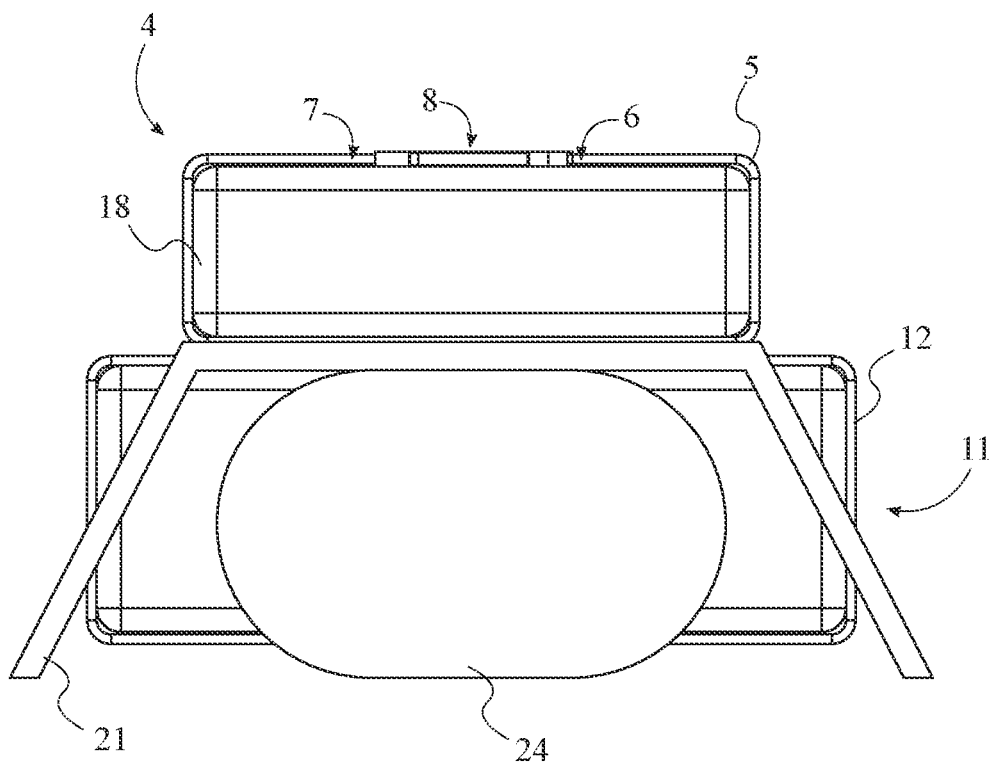
FIG. 6 is a rear view of the present invention, wherein the plurality of cargo straps and the plurality of holder straps are shown fastened, and wherein the chute canister and the payload are shown mounted, and wherein a first base flotation device is shown inflated.

In addition to the plurality of cargo flotation devices 23, the present invention can also include additional flotation devices distributed along the base strap 1 to help maintain the payload floating in a desired orientation. As can be seen in FIGS. 5 and 6, the present invention may further comprise a first base flotation device 24 and a second base flotation device 25. The first base flotation device 24 is terminally connected to the base strap 1 to secure the first base flotation device 24 to the base strap 1. Likewise, the second base flotation device 25 is terminally connected to the base strap 1, opposite to the first base flotation device 24, to secure the second base flotation device 25 to the base strap 1. This way, the first base flotation device 24 and the second base flotation device 25 provide additional support to the payload to remain afloat while also preventing the payload from turning over. In addition to the flotation devices, the present invention may include means to separate the parachute 19 from the present invention. For example, the connection between the parachute 19 and the chute canister 18 can be mechanically separated once the payload enters the body of water. A controller with several sensors can be included to detect the submersion of the payload in the body of water which engages the mechanical device that releases the parachute 19 from the chute canister 18. This way, the parachute 19 does not drag the payload along the current of the body of water. Similarly, the different flotation devices can be engaged by the controller once the payload has been detected to be submerged in the body of water.

Figure 8:
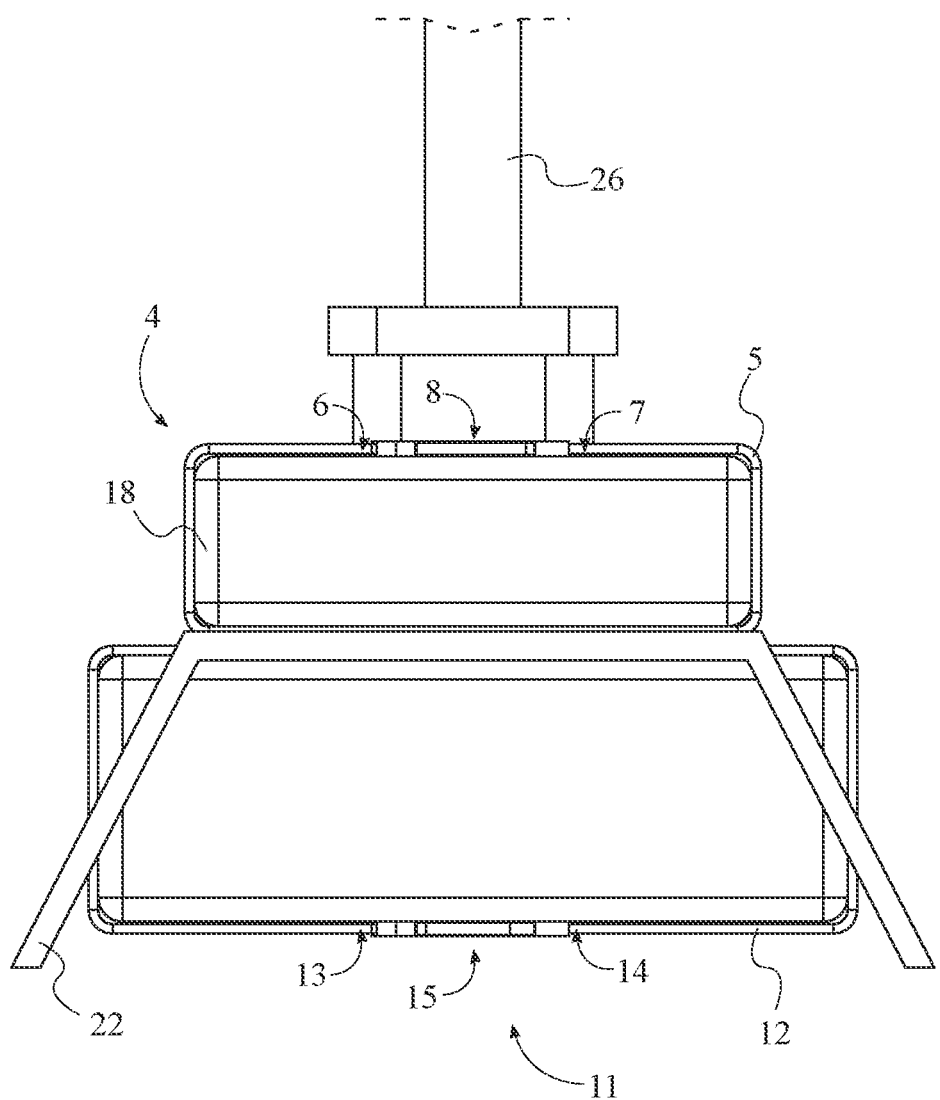
FIG. 8 is a front view of the present invention, wherein the plurality of cargo straps and the plurality of holder straps are shown fastened, and wherein the chute canister and the payload are shown mounted, and wherein the present invention is shown connected to a releasable suspender.
Figure 9:
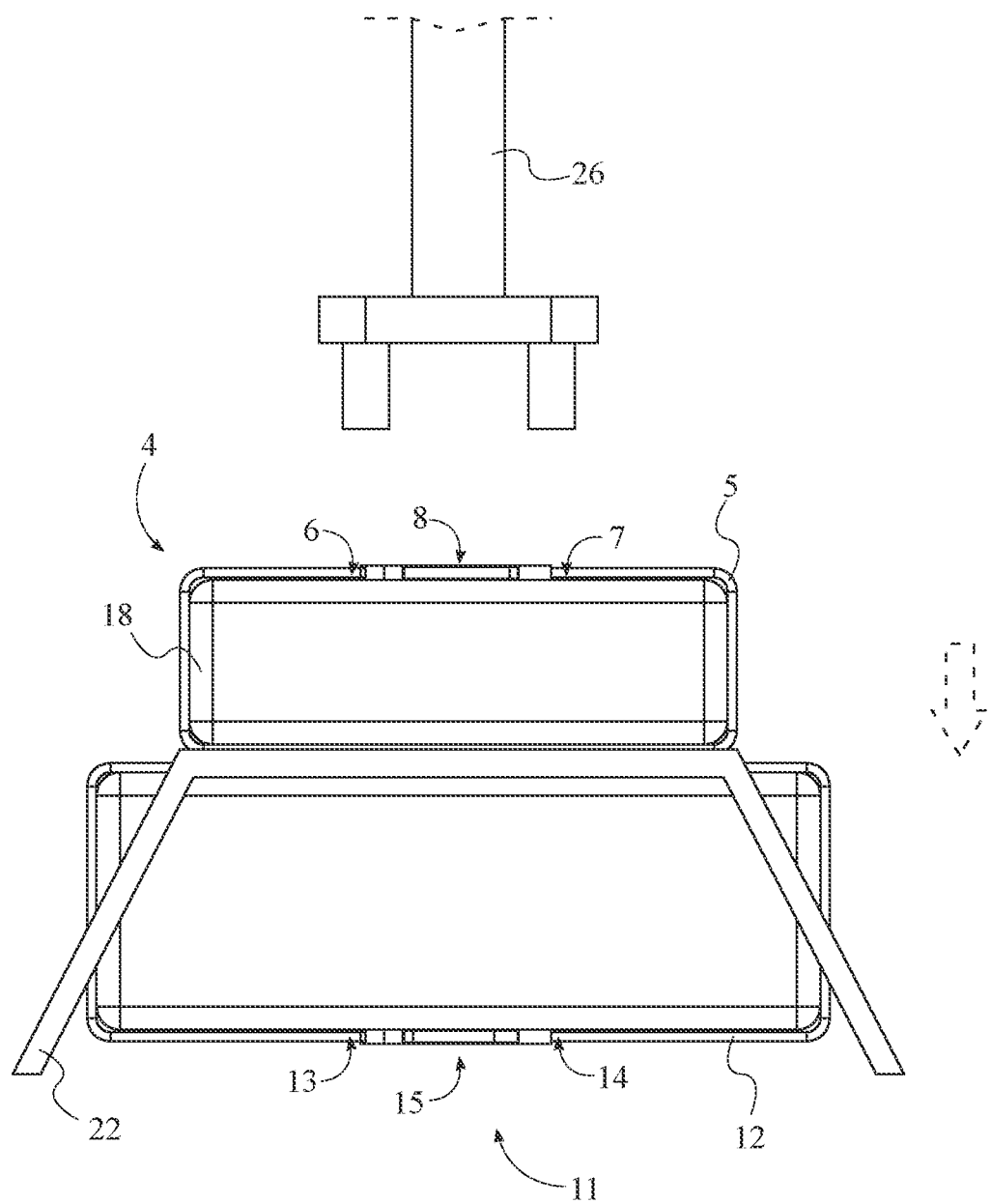
FIG. 9 is a front view of the present invention, wherein the plurality of cargo straps and the plurality of holder straps are shown fastened, and wherein the chute canister and the payload are shown mounted, and wherein the present invention is shown connected to the releasable suspender.
Figure 10:
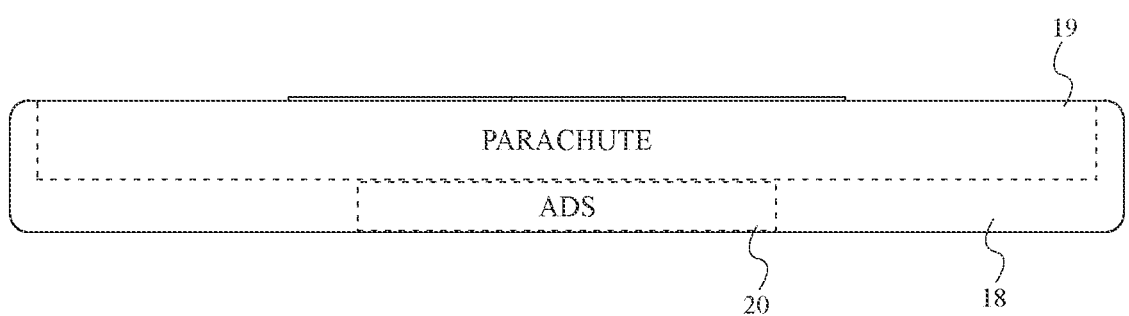
FIG. 10 is a side schematic view of the chute canister of the present invention, wherein a parachute and an automatic deployment system are shown mounted within the chute canister.

As previously discussed, the present invention is designed to be transported by an aerial vehicle to a target area where the present invention is released to descend towards the target location. As can be seen in FIGS. 8 and 9, to enable the controlled release of the present invention on the target area, the present invention may further comprise a releasable suspender 26. The releasable suspender 26 secures the present invention to the aerial vehicle during transportation and can be selectively engaged to release the present invention. To do so, the releasable suspender 26 is operatively coupled to the base strap 1, wherein the releasable suspender 26 is used to readily release the base strap 1 from an aerial transportation vehicle. For example, the releasable suspender 26 can include a mechanical connection that tethers the base strap 1 to the aerial vehicle during transportation. The aerial vehicle's onboard computer or a remote computer can engage the releasable suspender 26 to release the base strap 1, which enables the present invention with the payload to free fall until the ADS 20 engages and deploys the parachute 19.

The present invention may be tested for maximum breaking points for the entire structure. The test may be performed to see if the plurality of cargo straps 11 can hold the payload if the stirrup or the base strap 1 breaks. A test may be performed to see how many cargo straps can fail before failure is catastrophic. Further, success criteria of the present invention may be evaluated by static platform tests at 50 ft, 100 ft, static unmanned aircraft tests at 100 ft, 200 ft, and 300 ft, dynamic tests being dropped from manned and unmanned aircraft at different altitudes approved by the Federal Aviation Administration, and Compliance with FAA Part 91.15, Part 105 and Part 107.23. The present invention may be associated and in compliance with FAA Part 135. The present invention may also be associated with universities and technical organizations for evaluation, design assistance, testing facilities, and technical standards order filing with the FAA, IAA, CAA, and European Union Aviation Safety Agency (EASA). Further, the present invention may undergo testing for the ADS 20 or similar for the deployment of the parachute 19.

Further, medical providers may review testing data, providing input as to needs and requirements per specific working environment. Law enforcement providers may also review testing data, providing input as to needs and requirements per specific working environment. Further, FAA, IAA, CAA, and European Union Aviation Safety Agency (EASA) may review testing data, providing input as to needs and requirements per specific working environment. Further, evaluators outside of the normal requests include approved Imperial College London faculty or identified experts, approved Oxford faculty or identified experts, approved College Cork faculty or identified experts, United Kingdom Civil Aviation Authority officers, Irish Aviation Authority officers, and other approved field experts.

Furthermore, the present invention can be provided in different dimensions to accommodate different payload sizes. For example, in a medium-size embodiment, the base strap 1 can have a length of 4.75 ft (57 in.) and a width of 1.75 in. The plurality of holder straps 4 and the plurality of cargo straps 11 can have a length of 4.17 ft (50 in.) and a width of 1.75 in. Further, the webbing used can be AMP 5000 lbs. heavy duty industrial, with a fastening webbing width of 1.75 in. The medium-size embodiment can include a pocket to secure the chute canister 18. The pocket can be 1.57 in. in diameter and 6.05 in. in length. In a large-size embodiment, the base strap 1 can have a length of 5.17 ft (62 in.) and a width of 1.75 in. The plurality of holder straps 4 and the plurality of cargo straps 11 can have a length of 3.5 ft (42 in.) and a width of 1.75 in. Further, the webbing used can also be AMP 5000 lbs. heavy duty industrial, with a fastening webbing width of 1.75 in. The large-size embodiment can include a pocket to secure the chute canister 18. The pocket can be 1.57 in. in diameter and 6.05 in. in length.

Although the invention has been explained in relation to its preferred embodiment, it is to be understood that many other possible modifications and variations can be made without departing from the spirit and scope of the invention.

What is claimed is:

1. A payload delivery device comprising:
   a base strap;
   a plurality of holder straps;
   a plurality of cargo straps;

a first landing riser;
a second landing riser;
the base strap comprising a first base face and a second base face;
the plurality of holder straps being positioned parallel to each other;
each of the plurality of holder straps being positioned perpendicular to the base strap;
the plurality of holder straps being distributed along the base strap;
the base strap being centrally positioned to each of the plurality of holder straps;
each of the plurality of holder straps being connected onto the first base face;
the plurality of cargo straps being positioned parallel to each other;
the plurality of cargo straps being positioned perpendicular to the base strap;
the plurality of cargo straps being distributed along the base strap;
the base strap being centrally positioned to each of the plurality of cargo straps;
each of the plurality of cargo straps being connected onto the second base face;
the first landing riser and the second landing riser being positioned parallel to each other;
the first landing riser being terminally connected to the base strap; and
the second landing riser being terminally connected to the base strap, opposite to the first landing riser.

2. The payload delivery device as claimed in claim 1 comprising:
a chute canister;
the chute canister being positioned along the base strap;
each of the plurality of holder straps being laterally positioned around the chute canister; and
the chute canister being restrained against the first base face by the plurality of holder straps.

3. The payload delivery device as claimed in claim 2 comprising:
a parachute;
an automatic deployment system (ADS);
the parachute being positioned within the chute canister;
the ADS being mounted within the chute canister; and
the ADS being operatively coupled to the parachute, wherein the ADS is used to automatically deploy the parachute from the chute container at a specified altitude.

4. The payload delivery device as claimed in claim 1, wherein:
each of the plurality of holder straps comprising a holder strap body and a holder strap fastener;
the holder strap body comprising a first holder strap end and a second holder strap end;
the holder strap fastener comprising a first holder interlocking piece and a second holder interlocking piece;
the first holder interlocking piece being connected adjacent to the first holder strap end; and
the second holder interlocking piece being connected adjacent to the second holder strap end.

5. The payload delivery device as claimed in claim 1, wherein:
each of the plurality of cargo straps comprising a cargo strap body and a cargo strap fastener;
the cargo strap body comprising a first cargo strap end and a second cargo strap end;
the cargo strap fastener comprising a first cargo interlocking piece and a second cargo interlocking piece;
the first cargo interlocking piece being connected adjacent to the first cargo strap end; and
the second cargo interlocking piece being connected adjacent to the second cargo strap end.

6. The payload delivery device as claimed in claim 1 comprising:
a plurality of cargo flotation devices;
the plurality of cargo flotation devices being positioned offset from the base strap; and
each of the plurality of cargo flotation devices being connected adjacent to a corresponding cargo strap from the plurality of cargo straps.

7. The payload delivery device as claimed in claim 1 comprising:
a first base flotation device;
a second base flotation device;
the first base flotation device being terminally connected to the base strap; and
the second base flotation device being terminally connected to the base strap, opposite to the first base flotation device.

8. The payload delivery device as claimed in claim 1 comprising:
a releasable suspender; and
the releasable suspender being operatively coupled to the base strap, wherein the releasable suspender is used to readily release the base strap from an aerial transportation vehicle.

9. A payload delivery device comprising:
a base strap;
a plurality of holder straps;
a plurality of cargo straps;
a chute canister;
a releasable suspender;
the base strap comprising a first base face and a second base face;
the plurality of holder straps being positioned parallel to each other;
each of the plurality of holder straps being positioned perpendicular to the base strap;
the plurality of holder straps being distributed along the base strap;
the base strap being centrally positioned to each of the plurality of holder straps;
each of the plurality of holder straps being connected onto the first base face;
the plurality of cargo straps being positioned parallel to each other;
the plurality of cargo straps being positioned perpendicular to the base strap;
the plurality of cargo straps being distributed along the base strap;
the base strap being centrally positioned to each of the plurality of cargo straps;
each of the plurality of cargo straps being connected onto the second base face;
the chute canister being positioned along the base strap;
each of the plurality of holder straps being laterally positioned around the chute canister;
the chute canister being restrained against the first base face by the plurality of holder straps; and
the releasable suspender being operatively coupled to the base strap, wherein the releasable suspender is used to readily release the base strap from an aerial transportation vehicle.

10. The payload delivery device as claimed in claim 9 comprising:
- a parachute;
- an automatic deployment system (ADS);
- the parachute being positioned within the chute canister;
- the ADS being mounted within the chute canister; and
- the ADS being operatively coupled to the parachute, wherein the ADS is used to automatically deploy the parachute from the chute container at a specified altitude.

11. The payload delivery device as claimed in claim 9 comprising:
- a first landing riser;
- a second landing riser;
- the first landing riser and the second landing riser being positioned parallel to each other;
- the first landing riser being terminally connected to the base strap; and
- the second landing riser being terminally connected to the base strap, opposite to the first landing riser.

12. The payload delivery device as claimed in claim 9, wherein:
- each of the plurality of holder straps comprising a holder strap body and a holder strap fastener;
- the holder strap body comprising a first holder strap end and a second holder strap end;
- the holder strap fastener comprising a first holder interlocking piece and a second holder interlocking piece;
- the first holder interlocking piece being connected adjacent to the first holder strap end; and
- the second holder interlocking piece being connected adjacent to the second holder strap end.

13. The payload delivery device as claimed in claim 9, wherein:
- each of the plurality of cargo straps comprising a cargo strap body and a cargo strap fastener;
- the cargo strap body comprising a first cargo strap end and a second cargo strap end;
- the cargo strap fastener comprising a first cargo interlocking piece and a second cargo interlocking piece;
- the first cargo interlocking piece being connected adjacent to the first cargo strap end; and
- the second cargo interlocking piece being connected adjacent to the second cargo strap end.

14. The payload delivery device as claimed in claim 9 comprising:
- a first base flotation device;
- a second base flotation device;
- a plurality of cargo flotation devices;
- the plurality of cargo flotation devices being positioned offset from the base strap;
- each of the plurality of cargo flotation devices being connected adjacent to a corresponding cargo strap from the plurality of cargo straps; and
- the first base flotation device being terminally connected to the base strap;
- the second base flotation device being terminally connected to the base strap, opposite to the first base flotation device.

15. A payload delivery device comprising:
- a base strap;
- a plurality of holder straps;
- a plurality of cargo straps;
- a chute canister;
- a releasable suspender;
- a parachute;
- an automatic deployment system (ADS);
- the base strap comprising a first base face and a second base face;
- the plurality of holder straps being positioned parallel to each other;
- each of the plurality of holder straps being positioned perpendicular to the base strap;
- the plurality of holder straps being distributed along the base strap;
- the base strap being centrally positioned to each of the plurality of holder straps;
- each of the plurality of holder straps being connected onto the first base face;
- the plurality of cargo straps being positioned parallel to each other;
- the plurality of cargo straps being positioned perpendicular to the base strap;
- the plurality of cargo straps being distributed along the base strap;
- the base strap being centrally positioned to each of the plurality of cargo straps;
- each of the plurality of cargo straps being connected onto the second base face;
- the chute canister being positioned along the base strap;
- each of the plurality of holder straps being laterally positioned around the chute canister;
- the chute canister being restrained against the first base face by the plurality of holder straps;
- the releasable suspender being operatively coupled to the base strap, wherein the releasable suspender is used to readily release the base strap from an aerial transportation vehicle;
- the parachute being positioned within the chute canister;
- the ADS being mounted within the chute canister; and
- the ADS being operatively coupled to the parachute, wherein the ADS is used to automatically deploy the parachute from the chute container at a specified altitude.

16. The payload delivery device as claimed in claim 15 comprising:
- a first landing riser;
- a second landing riser;
- the first landing riser and the second landing riser being positioned parallel to each other;
- the first landing riser being terminally connected to the base strap; and
- the second landing riser being terminally connected to the base strap, opposite to the first landing riser.

17. The payload delivery device as claimed in claim 15, wherein:
- each of the plurality of holder straps comprising a holder strap body and a holder strap fastener;
- the holder strap body comprising a first holder strap end and a second holder strap end;
- the holder strap fastener comprising a first holder interlocking piece and a second holder interlocking piece;
- the first holder interlocking piece being connected adjacent to the first holder strap end; and
- the second holder interlocking piece being connected adjacent to the second holder strap end.

18. The payload delivery device as claimed in claim 15, wherein:
- each of the plurality of cargo straps comprising a cargo strap body and a cargo strap fastener;
- the cargo strap body comprising a first cargo strap end and a second cargo strap end;
- the cargo strap fastener comprising a first cargo interlocking piece and a second cargo interlocking piece;

the first cargo interlocking piece being connected adjacent to the first cargo strap end; and the second cargo interlocking piece being connected adjacent to the second cargo strap end.

19. The payload delivery device as claimed in claim 15 comprising:

a first base flotation device;

a second base flotation device;

a plurality of cargo flotation devices;

the plurality of cargo flotation devices being positioned offset from the base strap;

each of the plurality of cargo flotation devices being connected adjacent to a corresponding cargo strap from the plurality of cargo straps; and the first base flotation device being terminally connected to the base strap;

the second base flotation device being terminally connected to the base strap, opposite to the first base flotation device.

\* \* \* \* \*